(Model.)
J. SCHUSTER & P. SCHAU.
Wheel Harrow and Cultivator.
No. 241,825.        Patented May 24, 1881.
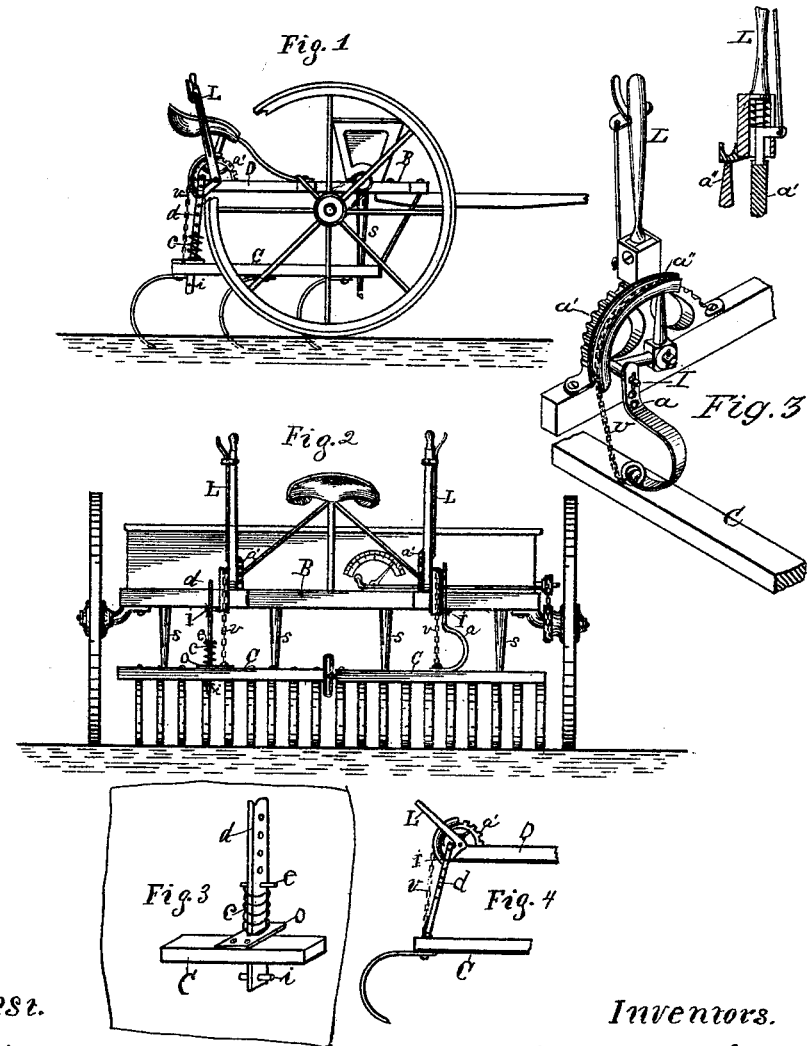

UNITED STATES PATENT OFFICE.

JULIUS SCHUSTER AND PHILLIP SCHAU, OF KALAMAZOO, MICHIGAN.

WHEEL HARROW AND CULTIVATOR.

SPECIFICATION forming part of Letters Patent No. 241,825, dated May 24, 1881.

Application filed October 20, 1880. (Model.)

*To all whom it may concern:*

Be it known that we, JULIUS SCHUSTER and PHILLIP SCHAU, residents respectively of Kalamazoo, Michigan, have invented new and useful Improvements in Wheel Harrows and Cultivators, of which the following is a specification.

Our invention relates to bars connecting with the lifting-lever and share-frame of wheel harrows and cultivators for producing a rigid and semi-rigid engagement of the shares or teeth; and it has for its object certain improvements in the construction and use of a spring-bar, which is detachably connected at its upper end with the lifting-lever, whereby said bar may be readily thrown down out of the way when desiring to raise the share-frame with the lifting lever and chain in the usual manner, and said bar still be carried along with the share-frame ready for use.

In the accompanying drawings, forming a part of this specification, Figure 1 is a side elevation of a device showing a bar provided with a coil-spring; Fig. 2, a rear elevation, showing at the right the spring-bar comprehended in our invention; Fig. 3, an enlarged view of said spring-bar, showing its mode of connecting with frame and lever; and Fig. 4, a detached portion of Fig. 1, showing a plain straight bar.

B is an axle-frame; C, share-frame; and D, rearwardly-extending arm, to which lever L, with its ratchet $a'$ and grooved half-wheel $a''$, bearing chain $v$, is connected, in the usual manner.

The bar $a$ is made, in substantially the form illustrated, from spring metal, and is jointedly connected with the share-frame C by means of a staple passing through a hole in the end of the bar, and is detachably connected with stud $i$ of lever L. The upper end of the bar is provided with a series of holes, into one of which stud $i$ is loosely located. The bar is held onto the stud by a detachable key. The several holes in the upper end of the bar allow the bar to be adjusted in accordance with the distance between the lever and frame, the desired pressure to be exerted on the shares, and also to control the degree of tension desired on the spring portion of the bar, which is the curved center portion. The plain rigid bar $d$, and this bar provided with the coil-spring $c$, imparting to it an elastic effect, are other ways in which the harrow may be provided with pressure-bars; but the spring-bar $a$ as connected is preferred by us as being the most practical.

The use of pressure-bars and the novel utility of our invention will be understood by the operation.

In harrowing a field, should hard strips of soil intercept the shares, the lever L is locked back by the ratchet device, which causes the pressure-bar to bear down the share-frame, holding the teeth rigidly, or partially so, to their work. When the hard soil is passed, the bar $a$ can be detached readily from its connection with stud $i$ and swung down, but still remain connected with the harrow, and thus carried along ready for use. This is also the case when desiring to raise the tooth-frame by the chain, as previously stated.

What we claim is—

In a harrow or cultivator, the combination, substantially as shown and described, of the lifting-lever, carrying the grooved chain-wheel and spring-bar stud, the ratchet, chain, and the detachable and adjustable spring-bar $a$, jointedly connected at its lower end to the share-frame.

JULIUS SCHUSTER.
PHILLIP SCHAU.

Witnesses:
JOHN H. CHASE,
LOUIS SCHILLING.